3,305,495
PROCESS FOR THE CONTINUOUS RE-USE OF POLYETHYLENE TEREPHTHALATE WASTE
Hans-Otto Vom Orde, Bobingen, near Augsburg, Germany, assignor to Farbwerke Hoechst Aktiengesellschaft vormals Meister Lucius & Brüning, Frankfurt am Main, Germany, a corporation of Germany
No Drawing. Filed Sept. 20, 1963, Ser. No. 310,471
Claims priority, application Germany, Sept. 27, 1962,
F 37,896
4 Claims. (Cl. 260—2.3)

The present invention relates to a process for the continuous re-use of polyethylene terephthalate waste. The invention is concerned in particular with the re-utilization of polyethylene terephthalate waste for the preparation of polyethylene terephthalate of high molecular weight and in this respect it is concerned above all with the utilization of polyethylene terephthalate waste in combination with a precondensation product of polyethylene terephthalate of low molecular weight.

It has been known to degrade polyethylene glycol terephthalic acid esters by alcoholysis. Since processes for the interchange of ester radicals which is accompanied by the degradation of the macromolecules can suitably be combined with one of each of the steps of the preparation of the polyesters they have become particularly important with respect to the re-use of linear polyester waste as forming in the preparation of films and sheets or textile filaments and fibers.

The preparation of polyethylene terephthalate is based on reactions of esterification and interchange of ester radicals which are carried out discontinuously or continuously. If the process begins with the preparation of terephthalic acid which is brought about, for example by the oxidation of p-xylene, this operation is followed by the esterification with an alcohol of low molecular weight which is either carried out under pressure or in the presence of an excess amount of the alcohol and which results, for example, in the formation of dimethyl terephthalate. The equilibrium of the reaction can be influenced under pressure by the addition of a limited quantity of substances of high molecular weight in such a manner that the interchange of ester radicals which entails a degradation leads to an almost complete conversion of the starting material into dialkyl terephthalate. In the next stage the purified dialkyl terephthalate is subjected to an interchange of ester radicals with excess of diol in the presence of a catalyst, whereby the bisglycol ester forms, for example, bis-($\beta$-hydroxy-ethyl)-terephthalate. The degradation of waste product which has been disintegrated and freed from chemical adjuvants, for example, textile auxiliaries, can also be brought about in a melt of the aforesaid monomer compound as long as the diol contributes to the dissolution. The amount of polyester waste that may be added is limited by the shifting of the equilibrium of glycolysis. In known processes the first stage does not end by the preparation of bisglycolic ester but subsequently a catalytically accelerated polycondensation is carried out, in the course of which the excess of diol is split off and eliminated and polyethylene terephthalate of low molecular weight (precondensation product) is formed. According to the same mechanism of reaction the corresponding polyester of high molecular weight is obtained in the last stage of the process. This polyester can be spun or be processed into sheets or films in the molten state.

It has been known to re-use polyethylene terephthalate waste in the stage of the process in which dialkyl terephthalate is prepared or between the preparation of bis-($\beta$-hydroxyethyl)-terephthalate and the formation of the precondensation product. According to German Patent 1,085,147 25% of commercially available polyester waste is added to an oxidation mixture of p-xylene and p-toluic acid, and the resulting mixture is treated with methyl alcohol under pressure in the manner described in German Patent 1,041,945. The terephthalic acid dimethyl ester that is continuously obtained comprises no more than 35% of substances of high molecular weight that have been degraded and undergone an interchange of ester radicals. Besides, approximately one tenth of their quantity is lost.

U.S. Patent 2,933,476 describes a method of re-using polyethylene terephthalate which enables the height to which the apparatus is filled to be regulated in the continuous preparation of this polyester. Sheet or film waste or filament waste and residues of grinding processes, all of which are formed of polyethylene terephthalate and have been freed from textile auxiliaries or finishing agents, are continuously dissolved in bis-($\beta$-hydroxyethyl)-terephthalate at a temperature within the range of 225° to 240° C. The concentration of the additive is advantageously up to 50%, and preferably within the range of 10 to 30%, the percentages being calculated on the starting quantity of dialkyl terephthalate.

The polycondensation of the viscous melt can be carried out discontinuously or continuously. When it is carried out discontinuously it is brought about in one reactor while the temperature is increased and the pressure is reduced, and when it is carried out continuously it is brought about in more than one apparatus while the flow properties are made use of, the polycondensation depending in the latter case on certain thicknesses of the layers of the melt and/or on the dimensions of the surfaces. According to German Patent 832,088 processes of falling-film evaporation can be carried out in the course of the precondensation or polycondensation without the application of reduced pressure only within a certain range. British Patent 878,125 teaches how definite layers of the melt which have a thickness within the range of 1 to 18 centimeters can be adjusted under constantly reduced pressure in cases in which the temperature used is higher than the temperature that is generally used in polycondensation processes. In this case polycondensation must not last longer than 20 minutes.

Now I have found that polyethylene terephthalate waste can be continuously re-used when a melt of a precondensation product of polyethylene terephthalate of low molecular weight and polyethylene terephthalate waste of high molecular weight is subjected to continuous polycondensation according to the principle of the falling-film evaporation under reduced pressure and under the action of elevated temperatures. According to the present invention the material is subjected to the polycondensation in the form of a melt which has a viscosity number $Z_\eta$ (cf. H. Staudinger, "Kolloidchemie," 3rd edition, 1950, page 210) of more than 0.03 and preferably within the range of 0.032 to 0.035, the viscosity number $Z_\eta$ being determined after chilling test specimens of the mixture at 25° C. in a solution in phenol and tetrachloroethylene (60:40).

At temperatures above 300° C., preferably within the range of 305° to 315° C., and under a pressure which is reduced from an initial pressure within the range of 25 to 18 mm. of mercury to 0.5 mm. of mercury, the molten mass has flow properties owing to which it can be further processed in layers having a thickness within the range of about 0.8 to 2 millimeters according to a method of falling-film evaporation. A continuous polycondensation in two falling-film evaporators that are connected with one another enables residence times of less than 15 minutes to be attained, by residence time being here understood the period beginning with the melting and ending with commencement of the spinning process. The viscosity numbers of the filaments spun from the polycondensation product prepared by the process of the invention are within the range of 0.067 to 0.083.

In the process according to the invention the polyethylene terephthalate waste may be added in such an amount that it constitutes a large portion of the molten mass and, moreover, the waste may be of different origin and different viscosity. Advantageously, the waste or mixture of waste which has an average viscosity number within the range of 0.08 to 0.088 is added in a portion of 35% by weight, and the polyethylene glycol terephthalic acid ester of low molecular weight which has a mean viscosity number within the range of 0.01 to 0.012 is used in a portion of 65% by weight.

Owing to the careful treatment of the molten mass in vacuo in the process of the falling-film evaporation even polyethylene terephthalate waste of high molecular weight which has been pre-treated with textile auxiliaries can be re-used, and polycondensation products with a low content of diethylene glycol can be prepared. It is, for example, possible to re-use filaments and fibers containing up to 2% of their weight of textile preparation agents. The portion of diethylene glycol contained in the polycondensation product is smaller than 1.2% and preferably within the range of 1.0 to 1.1%, in cases in which the polyethylene terephthalate waste contains 1.0 to 1.2% of diethylene glycol and the precondensation product contains 0.7 to 0.9% of diethylene glycol, the content of diethylene glycol in the polycondensation product being determined after hydrolytical splitting and calculated on the polycondensation product.

The polyethylene terephthalate of low molecular weight is prepared by the interchange of ester radicals of dimethyl terephthalate with ethylene glycol and subsequent condensation until its viscosity number is smaller than 0.012. It is then chilled and disintegrated in a suitable apparatus. The waste of fibers, filaments, sheets and films that is to be re-used must be cut into small pieces. Independently of their titre, wastes of filaments or fibers are advantageously cut into pieces having an irregular length within the range of 0.5 to 1.5 centimeters. The mixtures of the material of low molecular weight with the waste substances of high molecular weight thus obtained can well be introduced into heated extruder screws in which the components are melted at a temperature of 260° to 262° and simultaneously mixed. The molten mass is then fed via a buffer mass and a system of suitable feed pumps to the first falling-film evaporator where it is further condensed under a pressure within the range of 18 to 25 mm. of mercury and at a temperature within the range of 305° to 310° C. under the action of gravity and while the surface is continuously renewed. The final condensation is carried out under a reduced pressure of 0.5 mm. or less than 0.5 mm. of mercury and at a temperature within the range of 305° to 315° C. in a second falling-film evaporator which is arranged after the first one and which is likewise charged by means of feed pumps. The final viscosity of the molten mass can be influenced in particular by the reduced pressure applied in the first evaporation stage. The molten mass of the polycondensation product can be spun or processed into sheets or films immediately after the aforesaid treatment.

The following example serves to illustrate the invention but it is not intended to limit it thereto.

*Example*

74.4 grams of a mixture of 48.36 grams of a granulated precondensation product of polyethylene terephthalate and 26.04 grams of disintegrated polyethylene terephthalate waste coming from the preparation of textile filaments having different titers were fed per minute to an extruder screw.

The precondensation product had a viscosity number of 0.011 and contained 0.7% of diethylene glycol. It was prepared continuously by the interchange of ester radicals of dimethyl terephthalate with ethylene glycol and subsequent precondensation until the said viscosity number of 0.011 was obtained. The waste products obtained in the spinning process had a viscosity number of 0.084. They contained different catalysts because they were prepared in different polymerization batches. On an average they contained 1.05% of diethylene glycol and 0.4% by weight of textile auxiliaries. The staples of which they were made up had an irregular length within the range of 0.5 and 1.5 centimeters.

After the mixture had been melted continuously at a temperature within the range of 260° to 262° C. the molten mass which had a viscosity number of 0.032 was fed by a system of feed pumps into a vertically arranged falling-film evaporator having an evaporation surface of 0.35 square meter which was heated to a temperature within the range of 305° to 310° C. by means of a heat transfer agent conducted in a cycle. The stirrer which was provided with semi-movable blade wipers moved at a speed of 440 r.p.m. The pressure was maintained at 20 mm. of mercury. Ethylene glycol that was split off in the form of vapour was subject to a continuous condensation.

In a second falling-film evaporator having the same construction and evaporation surface as the first one polycondensation was carried out at a temperature within the range of 305° to 315° C. and under a pressure of 0.5 mm. of mercury while the surface was continuously changed. This was brought about above all by means of a stirrer which moved at a speed of 400 r.p.m. The molten mass of high molecular weight was discharged in an amount of 70 grams per minute by means of a screw. In this second falling-film evaporator ethylene glycol that had been set free was likewise condensed and combined with the ethylene glycol split off during the first evaporation stage. On an average 210 grams per hour of the ethylene glycol were withdrawn and mixed with small amounts of higher and lower boiling substances. 70 grams per minute of a polycondensation product were obtained which could be chilled when still in the molten state or be spun directly into filaments. The solidified molten mass had a viscosity number of 0.077. When the melt was directly spun into continuous filaments the resulting filaments, after elimination of the textile auxiliaries, had an average viscosity number of 0.075 and an average content of diethylene glycol of 1.10%.

I claim:

1. A process for the production of high molecular weight polyethylene terephthalate utilizing waste polyethylene terephthalate which comprises (a) forming a melt of a low molecular weight polyethylene terephthalate precondensate and high molecular weight polyethylene terephthalate waste, said mixture having a viscosity number of greater than 0.03, said waste having a viscosity number between 0.08 and 0.088 and said precondensate having a viscosity number between 0.01 and 0.012 and (b) polycondensing said mixture at a temperature between 305 and 315° C. by falling-film evaporation in a first zone at a pressure of from 25 to 18 mm. mercury and thereafter in a second zone at a pressure less than 0.5 mm. mercury.

2. A process as claimed in claim 1, wherein a molten mass having a viscosity number within the range of 0.032 to 0.035 is subjected to the polycondensation.

3. A process as claimed in claim 1, wherein 35% by weight of a polyethylene terephthalate waste of high molecular weight having a viscosity number within the range of 0.08 to 0.088 and 65% by weight of a polyethylene terephthalate of low molecular weight having a viscosity number within the range of 0.01 to 0.012 are subjected to the polycondensation.

4. A process as claimed in claim 1, wherein the polycondensation product obtained contains less than 1.2% by weight of diethylene glycol.

References Cited by the Examiner

UNITED STATES PATENTS 3,250,747   5/1966   Mitchell et al. _____ 260—75

FOREIGN PATENTS 905,562   4/1959   Great Britain.

MURRAY TILLMAN, *Primary Examiner.*

D. J. BREZNER, *Assistant Examiner.*